United States Patent
Su et al.

(10) Patent No.: US 7,919,738 B2
(45) Date of Patent: *Apr. 5, 2011

(54) FREEZABLE/MICROWAVEABLE PACKAGING FILMS

(75) Inventors: Jau-Ming Su, Kent, WA (US); Paul Georgelos, Naperville, IL (US)

(73) Assignee: Pliant, LLC, Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/374,893

(22) Filed: Mar. 14, 2006

(65) Prior Publication Data

US 2007/0215609 A1  Sep. 20, 2007

(51) Int. Cl.
*H05B 6/80* (2006.01)

(52) U.S. Cl. ........ 219/730; 219/728; 428/216; 428/36.6

(58) Field of Classification Search .................. 219/725, 219/730, 734, 759, 728; 99/DIG. 14; 426/107, 426/234, 241–243; 428/34.3, 34.02, 195.1, 428/35.2, 35.7, 216, 457, 606, 36.6, 343, 428/145.1; 156/244.11; 206/557

See application file for complete search history.

(56) References Cited

U.S. PATENT DOCUMENTS

| | | | |
|---|---|---|---|
| 4,327,136 A * | 4/1982 | Thompson et al. ........... | 206/557 |
| 4,343,852 A * | 8/1982 | Isaka et al. .................... | 428/216 |
| 4,596,713 A * | 6/1986 | Burdette ........................ | 426/107 |
| 4,705,707 A * | 11/1987 | Winter .......................... | 428/34.3 |
| 4,836,438 A | 6/1989 | Rigby | |
| 4,939,009 A * | 7/1990 | Beavers et al. ............... | 428/35.2 |
| 5,021,293 A | 6/1991 | Huang et al. | |
| 5,045,330 A | 9/1991 | Pawlowski | |
| 5,298,708 A * | 3/1994 | Babu et al. .................... | 219/728 |
| 5,314,749 A | 5/1994 | Shah | |
| 5,464,969 A | 11/1995 | Miller | |
| 5,849,380 A * | 12/1998 | Kashiba et al. ............... | 428/36.6 |
| 6,006,960 A | 12/1999 | Gross | |
| 6,066,375 A | 5/2000 | Shanton | |
| 6,089,419 A | 7/2000 | Gross | |
| 6,186,374 B1 | 2/2001 | Gross | |
| 6,379,497 B1 | 4/2002 | Sandstrom et al. | |
| 6,660,983 B2 | 12/2003 | Monforton et al. | |
| 6,683,289 B2 | 1/2004 | Whitmore et al. | |
| 6,710,315 B2 | 3/2004 | Chisholm | |
| 6,744,028 B2 | 6/2004 | Chisholm et al. | |
| 6,790,526 B2 * | 9/2004 | Vargo et al. .................... | 428/343 |

(Continued)

FOREIGN PATENT DOCUMENTS

| | | |
|---|---|---|
| CA | 1284707 | 6/1991 |
| CA | 1336158 | 7/1995 |
| EP | 0214945 | 3/1987 |

(Continued)

OTHER PUBLICATIONS

Website page from BirdsEye: *BirdsEye Introduces Innovative Way to Steam Vegetables Perfectly—New Product Stearns Right in the Bag*, http: news/steamfresh. aspx, May 18, 2006.

(Continued)

*Primary Examiner* — Quang T Van
(74) *Attorney, Agent, or Firm* — Barnes & Thornburg LLP

(57) ABSTRACT

A multi-layer freezable/microwaveable film having both low temperature resistance and high temperature resistant to withstand subzero freezer storage temperatures and microwave cooking temperatures. The freezable/microwaveable film includes a three-layer coextruded film having a polypropylene/alpha-olefin copolymer inner, heat sealable layer, an adjacent polypropylene or high density polyethylene core layer, and an outer polyethylene skin layer adjacent the core layer opposite the heat sealable layer, and further includes an outer protective layer laminated to the outer skin layer.

25 Claims, 1 Drawing Sheet

U.S. PATENT DOCUMENTS

| | | |
|---|---|---|
| 6,815,023 B1 | 11/2004 | Tatarka et al. |
| 6,951,999 B2 | 10/2005 | Monforton et al. |
| 2002/0068182 A1 | 6/2002 | Kelch et al. |
| 2003/0148123 A1 | 8/2003 | Musco et al. |
| 2004/0052993 A1* | 3/2004 | Dawes .................. 428/35.7 |
| 2005/0136202 A1 | 6/2005 | Kendig et al. |
| 2005/0173050 A1* | 8/2005 | Peiffer et al. ............ 156/244.11 |
| 2006/0020067 A1 | 1/2006 | Brant et al. |

FOREIGN PATENT DOCUMENTS

| | | |
|---|---|---|
| EP | 1 488 924 | 12/2004 |
| EP | 1488924 A | 12/2004 |
| JP | 2005 035567 | 2/2005 |
| JP | 2005088971 A | 4/2005 |
| WO | WO2005/084937 | 9/2005 |

OTHER PUBLICATIONS

International Search Report corresponding to International Application No. PCT/US2006/49209, mailed Feb. 20, 2008, 4 pages.

Written Opinion of the International Searching Authority corresponding to International Application No. PCT/US2006/49209, mailed Feb. 20, 2008, 7 pages.

International Search Report corresponding to International Application No. PCT/US2008/050416, mailed Jan. 8, 2008, 6 pages.

Written Opinion of the International Search Authority corresponding to International Application No. PCT/US2008/050416, mailed Jan. 8, 2008, 8 pages.

International Preliminary Report on Patentability corresponding to International Application Serial No. PCT/US2006/049209, mailed Sep. 25, 2008, 7 pages.

European Search Report corresponding to European Patent Application Serial No. 06848120.9-1217, dated Mar. 9, 2009.

International Preliminary Report on Patentability corresponding to International Application No. PCT/US08/050416, mailed Jul. 16, 2009.

Office Action mailed May 20, 2010, for Canadian Patent Application Serial No. 2642278.

* cited by examiner

FREEZABLE/MICROWAVEABLE PACKAGING FILMS

FIELD OF THE INVENTION

The present technology relates in general to multilayer films which are suitable for use as packaging films. More particularly, the present technology relates to packaging films which are suitable for use as frozen food packaging which can be directly microwaved for heating or cooking. The present technology also relates to microwaveable food packaging made from the multilayer films.

BACKGROUND OF THE INVENTION

In recent years, there has been an increase in the number of food products that are designed or intended to go directly from the freezer to the microwave for heating or cooking. Such food products often require packaging that also can go directly from freezer storage temperatures, typically temperatures ranging from about −20° C. to about 0° C., to microwave cooking temperatures, typically temperatures ranging from about 71° C. to about 105° C., without fracturing in the freezer or melting or exploding in the microwave. Typically, food manufacturers utilize rigid containers coupled with a lid for packaging frozen microwaveable foods. Rigid microwaveable containers are disclosed, for example, in U.S. Pat. No. 6,066,375; U.S. Pat. No. 6,379,497; and U.S. Pat. No. 4,836,438.

There exists in the art a variety of multilayer films that can be used as packaging for frozen food products. Such multilayer films are primarily made from polyethylene resins which have good cold-temperature resistance, i.e., being able to withstand temperatures ranging from about −20° C. to about 0° C. without shattering or fracturing. Polyethylene films, however, soften at microwave temperatures, typically temperatures ranging from about 160° F. to about 220° F. (about 71° C. to about 105° C.), which causes weakening of the bonding strength of the polyethylene seal layer and/or between the polyethylene film layers and adjacent layers, leading to seal failure and/or layer delamination and leakage of the package contents during microwaving. Thus, frozen food products must be removed from such food packaging materials and then placed on a microwaveable dish or container before the products can be heated or cooked in a microwave.

Microwaveable film packaging materials are also known in the art. One such packaging material is a 3-layer laminated film structure of polypropylene homopolymer/adhesive/polyethylene terephthalate (PET). However, this film packaging material becomes brittle when subjected to freezer temperatures and breaks apart or shatters. Thus, although the packaging material may be microwaveable, it is not suitable for frozen food applications.

To meet the requirements for freezable/microwaveable food packaging, the packaging materials must have two essential properties: (1) they must have good low temperature (subzero) resistance so that the packaging can withstand subzero freezer storage temperatures without fracturing or shattering; and (2) they must have good high-temperature resistance to prevent the package from melting or exploding in the microwave. Currently available film packaging materials can only handle one end of the temperature spectrum or the other, and therefore are not suitable for both storing frozen food products and then heating or cooking the food products in the microwave.

There is, therefore, a need in the art for a film packaging material that is designed to package frozen and refrigerated foods for subsequent direct microwave heating or cooking.

SUMMARY OF THE INVENTION

One aspect of the present technology is directed to a multilayer film having good low temperature resistance, making the film suitable for use as a packaging material for frozen food products, as well as good high-temperature resistance, making the film suitable for use in the microwave. The multilayer film comprises a 3-layer coextruded polyolefin film comprising a heat-sealable, inner skin layer formed from a polypropylene/alpha-olefin copolymer; a core layer adjacent to the heat sealable inner layer, wherein the core layer is formed from a material having a melting point greater than about 71° C., and an outer skin layer adjacent to the core layer, opposite the heat sealable inner layer, wherein the outer skin layer is formed from at least one polyethylene resin; and an outer protective layer laminated to the outer skin layer of the polyolefin film. Another aspect of the present technology is directed to microwaveable packaging for freezing and storing food products which can be subsequently microwaved directly from the freezer in order to heat and/or cook the food products.

BRIEF DESCRIPTION OF THE DRAWINGS

While the specification concludes with claims particularly pointing out and distinctly claiming the subject matter which is regarded as the present invention, it is believed that the presently described technology will be more fully understood from the following description taken in conjunction with the accompanying figure, in which:

DETAILED DESCRIPTION OF THE PREFERRED EMBODIMENTS

Figure 1:
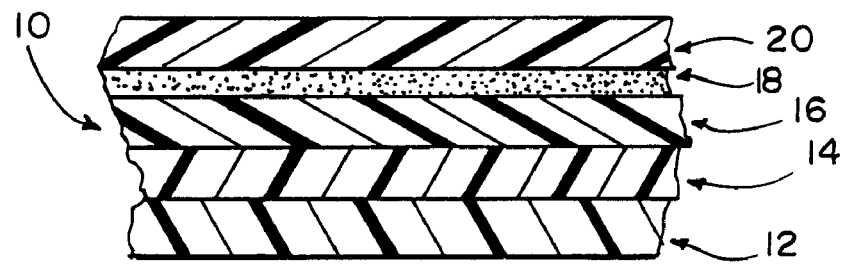
FIG. 1 is a cross-sectional view of a multilayer film of at least one embodiment of the present technology.

As illustrated in FIG. 1, a multilayer film 10 of the present technology comprises a polyolefin film having at least three layers: (a) an inner, heat sealable layer 12; (b) a core layer 14 adjacent to the inner heat sealable layer 12; and (c) an outer skin layer 16 adjacent to the core layer 14 such that the core layer is sandwiched between the inner heat sealable layer 12 and the outer skin layer 16. An adhesive 18 bonds the outer skin layer 16 of the polyolefin film to an outer protective layer 20 to form the multilayer freezable and microwaveable film.

The inner heat sealable layer 12 of the polyolefin film is formed from at least one thermoplastic polymer that is capable of heat sealing to itself or to another film layer. In order to make a film suitable for use as packaging for both freezer storage and microwave heating, the inner heat seal layer of the multilayer film should meet the following requirements: (1) it should have a low heat seal initiation temperature in order to be able to form adequate heat seals on standard packaging machines or form-fill-seal machines (either vertical or horizontal); (2) it should maintain its strength and have good ductility in subzero freezer temperatures (about −20° C. to about 0° C.); and (3) it should be able to maintain the heat seal at microwave temperatures (about 71° C. to about 105° C.) without bursting or leaking.

Commonly used resin materials for forming the heat seal layer of frozen food packages include polyethylene (LDPE or LLDPE) or derivatives thereof, such as ethylene vinyl acetate (EVA), or blends thereof. Unfortunately, such commonly used resin materials do not meet all of the properties needed for a suitable heat seal layer for a microwaveable freezer packaging material like that of the present technology. Polyethylene materials have a low melting temperature and low seal initiating temperature, and therefore cannot survive high temperature cooking in a microwave. High temperatures (about 71° C. to about 105° C.) soften and then weaken the polyethylene seal layer, resulting in heat seal or package failure.

Suitable materials for forming the heat sealable layer of the microwaveable packaging film of the present technology are those which have a seal initiation temperature within the range of from about 105° C. to about 135° C., and melting points within the range of from about 110° C. to about 150° C. Preferably, the heat seal layer is formed from at least one propylene/alpha-olefin copolymer. Suitable propylene/alpha-olefin copolymers include propylene/ethylene copolymer, propylene/butene copolymer, propylene/hexene copolymer, propylene/octene copolymer, mixtures thereof, and blends thereof. More preferably, the heat seal layer is formed from at least one propylene/ethylene copolymer, and even more preferably, a blend of at least two propylene/ethylene copolymers. Suitable propylene/ethylene copolymers for use herein are, for example, polypropylene copolymers comprising from about 1% to about 8% by weight of ethylene comonomer and having a melt flow rate from about 0.5 g/10 min. (measured at 230° C. in accordance with ASTM D1238-04) to about 45 g/10 min. (measured at 230° C. in accordance with ASTM D1238-04). Without wishing to be bound by any particular theory, it is believed that the incorporation of ethylene comonomer in the propylene/ethylene copolymer increases irregularity of the polymer chains which reduces the crystallinity of the polymer. This results in a lower seal initiation temperature than if homopolymer polypropylene were used as the heat sealable material, as well as improved ductility at subzero temperatures.

The thickness of the heat sealable layer depends, in part, upon the size of the food package to be made from the freezable/microwaveable packaging film of the present technology. The heat sealable layer must be thick enough to form a strong seal, yet not so thick that it negatively affects the manufacture of the film. In general, the thickness of the heat sealable layer may range from about 0.1 mil to about 3 mils.

The core layer 14 is adjacent to the inner heat sealable layer 12 and is formed from a thermoplastic material that can form a strong adhesive bond with the heat sealable layer in order to prevent delamination of the layers from occurring during freezer storage and microwave cooking. The core layer material should also have a melting point well above microwave cooking temperatures (from about 71° C. to about 105° C.) in order to maintain its solid state and strength when the heat seal layer starts to soften in the microwave.

Suitable materials for forming the core layer 14 are those that are compatible with the materials selected for the heat sealable layer and have a melting point greater than about 71° C. The core layer material may be, for example, polypropylene or high density polyethylene (HDPE). A preferred material for the core layer is a homopolymer polypropylene having a melt flow rate of about 0.5 g/10 min. (measured at 230° C. in accordance with ASTM D1238-04) to about 25 g/10 min. (measured at 230° C. in accordance with ASTM D1238-04), and a melting point of about 158° C. to about 165° C. If a high density polyethylene is used for the core material, preferably it should have a melt flow rate of about 0.1 g/10 min to about 12 g/10 min. (measured at 230° C. in accordance with ASTM D1238-04 The thickness of the core layer may range from about 0.1 mil to about 4 mils.

The outer skin layer 16 is adjacent to the core layer 14 and is formed from at least one thermoplastic material having a melt flow index from about 0.50 g/10 min. to about 20 g/10 min. (measured at 190° C. in accordance with ASTM D1238-04). Preferably, the outer skin layer is formed from a blend of thermoplastic resins. For example, suitable materials for forming the outer skin layer include blends of polyethylene resins (LDPE, LLDPE, HDPE, or derivates thereof, such as EVA) having a melt flow index from about 0.50 g/10 min. (measured at 190° C.) to about 20 g/10 min. (measured at 190° C. in accordance with ASTM D1238-04). A preferred composition for the outer layer comprises a blend of low density polyethylene polymer (LDPE) having a melt flow index of about 0.5 g/10 min. to about 4.5 g/10 min. (measured at 190° C. in accordance with ASTM D1238-04) and a density of about 0.910 g/cc. to about 0.928 g/cc, and linear low density polyethylene (LLDPE) having a melt flow index of about 0.5 g/10 min. to about 4.5 g/10 min. (measured at 190° C. in accordance with ASTM D1238-04) and a density of about 0.910 g/cc. to about 0.928 g/cc. The outer skin layer may have a thickness ranging from about 0.1 to about 4 mils.

The polyolefin film of the present technology may be manufactured using a variety of known film processing techniques (coextrusion, lamination and the like). For example, the polyolefin film may be made via a blown film coextrusion process. The film is formed using a blown film apparatus composed of a multi-manifold circular die head having concentric circular orifices. The multilayer film is formed by coextruding a molten layer through a circular die, and a molten layer on the other or each opposite side of the first layer through additional circular dies concentric with the first circular die. Next, a gas, typically air, is blown through a jet that is concentric with the circular dies, thereby forming a bubble that expands the individual layers. The bubble is collapsed onto itself to form a pair of multilayer films attached at two opposite edges. Usually, the pair of attached multilayer films are then cut apart at one or more edges and separated into a pair of multilayer films that can be rolled up.

Alternatively, the polyolefin film may be manufactured using other extrusion processes known in the art, such as a cast film process, wherein melted and plasticized streams of individual layer materials are fed into a coextrusion die, such as a multi-manifold die. Upon emersion from the die, the layers are quenched to form a single multilayer film of polymeric material.

The polyolefin film may also be manufactured by a lamination process, in which each of the heat sealable layer, core layer, and outer skin layer are formed into separate layers which are then laminated together to arrive at the polyolefin film.

The layer sequence in the polyolefin film, in particular, the selection of materials for the layers and the arrangement of the particular layers in the polyolefin film, is important for obtaining a packaging film that does not fracture or crack when exposed to subzero temperatures and that does not melt when exposed to microwave temperatures. For example, if polyethylene, a typical material used for frozen food packaging, is used for the core layer, rather than for the outer skin layer as described herein, the adhesion strength between such a polyethylene core and the copolymer polypropylene heat seal layer is not sufficient, resulting in delamination between the polyethylene core layer and the heat seal layer and seal failure when the film is exposed to microwave temperatures. However, if a homopolymer polypropylene material is used for the core layer as described herein, the strength of the multi-layer film and the integrity of the heat seal can be maintained during exposure of the film to microwave temperatures. This is because the polypropylene material forms a strong adhesive bond with the copolymer polypropylene heat seal layer and, due to its high melting point, can maintain its solid state and strength at microwave temperatures, thereby providing support to the heat seal layer.

Ordinarily such homopolymer polypropylene materials are not used for frozen food packaging materials because such materials tend to have poor heat seal strength, as well as poor low temperature resistance, causing the packaging materials to fracture or shatter when exposed to freezer temperatures. It has been discovered, however, that homopolymer polypropylene materials can be used successfully in the freezable/microwaveable films of the present technology by coextruding the inner heat sealable layer comprising polypropylene copolymers on one side of the polypropylene core, and the outer skin layer comprising polyethylene on the other side of the core layer. It is believed that the inner and outer layers act to insulate the polypropylene core, thereby minimizing the tendency for embrittlement of the polypropylene layer to occur at subzero temperatures.

In one embodiment, the microwaveable films of the presently described technology include an adhesive layer 18 which is used to bond the outer protective layer 20 to the outer skin layer 16. Suitable adhesives for use herein are those that can maintain their adhesive strength at temperatures above about 100° C. and that are used to bond dissimilar material together. Examples of suitable adhesive materials for use herein include, but are not limited to, polyurethane, epoxides, and hot-melt of ethylene vinyl acetate, hot melt of polyamide, and hot-melt of polyester. One suitable polyurethane adhesive is a polyester-polyurethane adhesive available from Sovereign Specialty Chemicals, Buffalo, N.Y. under the trade name Primabond. One suitable epoxide adhesive is a cycloaliphatic epoxide available from Dow Chemical, Houston, Tex. under the trade name Cyracure.

The adhesive may be applied to the outer skin layer 16, the outer protective layer 20, or both, utilizing any acceptable technique known in the art. For example, a lamination coater may be used to apply the adhesive. Alternatively, solvent, solventless, or water-based adhesive lamination equipment may be used for laminating the outer protective layer 20 to the outer skin layer 16. The adhesive is applied in an amount sufficient to bond the outer protective layer to the outer skin layer of the coextruded film. In general, the thickness of the adhesive layer will typically be in the range of about 0.01 mil to about 0.5 mils.

Alternatively, non-adhesive bonding techniques known in the art may be utilized to bond the outer protective layer to the outer skin layer. For example, ultrasonic welding or heat bonding may be used to bond the outer protective layer to the outer skin layer.

The outer protective layer bonded to the polyolefin film provides strength, stiffness and a glossy surface to the multi-layer film. If a printed image is applied to the outer skin layer of the polyolefin film, the outer protective layer also protects the printed image from heat distortion and degradation. Suitable materials for forming the outer protective layer are those materials that have a high temperature resistance, such as, for example, polyethylene terephthalate (PET), and polyamides, including polyamide 6 and polyamide 6.6 (nylon). Also, oriented films, such as a biaxially oriented polypropylene film, or a biaxially oriented propylene/ethylene copolymer film may be used for forming the outer protective layer. The outer protective layer may have a thickness ranging from about 0.1 to about 3 mils.

Figure 2:
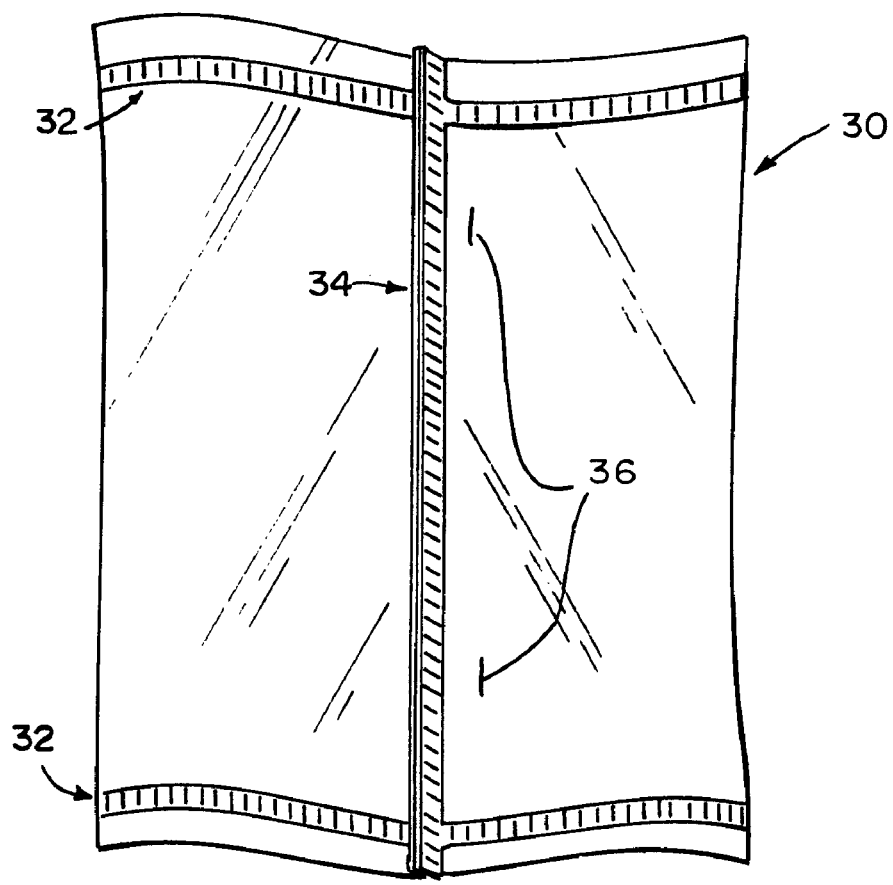
FIG. 2 illustrates a microwaveable pouch formed from the multilayer film of FIG. 1.

The multilayer freezable, microwaveable films described herein may be formed into packaging, such as, for example, the pouch-shaped package illustrated in FIG. 2, for fresh or frozen microwaveable food products. Conventional packaging equipment, such as vertical form fill and seal equipment or horizontal form fill and seal equipment may be used to form the package. Typically, in the operation of such equipment, the film to be formed into the package is fed from a roll to the equipment where it is wrapped about a forming tube and a longitudinal heat seal is provided to form the film into a tube. Thereafter, one end of the tube is closed and the inner heat seal layers are heat sealed together to form a pouch, which is then filled with a predetermined quantity of product. The filled pouch is then closed and the inner heat seal layers are heat sealed together at the open end to form a product packaged in a sealed pouch.

Illustrated in FIG. 2 is one embodiment of a microwaveable frozen food package 30 formed from the freezable microwaveable films described herein. The food package 30 is a pouch-shaped package having end seals 32 and a vertical seal 34. Prior to microwaving, it may be desirable to pierce the pouch 30 to form slits, such as slits 36. The purpose of the slits is to vent steam which may build up during microwave cooking thereby preventing the pouch from bursting due to the high pressure building up during microwaving.

One skilled in the art will recognize that modifications may be made in the presently described technology without deviating from the spirit or scope of the invention. The presently described technology is further illustrated by the following examples, which are not to be construed as limiting the invention or scope of the specific compositions described herein.

EXAMPLE 1

A microwaveable 3-layer film is made using a conventional blown film coextrusion process. The structure of the 3-layer film is given in Table 1 below.

TABLE 1

| Layer | Material/Wt % of Layer | Resin Grade | Density | Melt Flow |
|---|---|---|---|---|
| Heat seal | Copolymer polypropylene 30% | Total ™ EOD02-15 | 0.895 g/cc | 12 g/10 min. (230° C.) |
| | Copolymer polypropylene 70% | Dow 6D20 | 0.9 g/cc | 1.9 g/10 min. (230° C.) |
| Core | Homopolymer polypropylene 100% | Dow H110-02N | 0.9 g/cc | 2.0 g/10 min. (230° C.) |
| Outer Skin | Polyethylene 15% | Voridian E6838-969F | 0.921 g/cc | 0.7 g/10 min. (190° C.) |
| | LLDPE 85% | Dow 2045 | 0.92 g/cc | 1.0 g/10 min. (190° C.) |

A polyester-polyurethane adhesive available from Sovereign Specialty Chemicals under the trade name Primabond is applied to the outer skin layer to bond a PET film layer to the 3-layer coextruded film. The PET film is available from Celplast Metallized Product Limited, Toronto, Ontario, Canada, under the trade name Cel-PET, and has a thickness of 0.48 mil. The resulting PET-laminated 3-layer coextruded film was used to form a pillow-shaped freezable/microwaveable bag, such as illustrated in FIG. 2, to package 16 oz mixed frozen vegetables. A heat-seal machine (from Sencorp Inc., Hyannis, Mass., model 12-12ASL/1) was used to seal the top, bottom, and back of the bag. The heat sealing temperature was set at 280° C. The pressure of the heat seal jaws was 60 psi. The dwell time was 1 second. Then, a sharp knife was used to pierce two 4-mm slits in the back of the bag to vent steam and prevent pressure build-up.

The freezable/microwaveable bag was placed in a freezer at a temperature of about −18° C. for about 24 hours. After about 24 hours, the bag was removed from the freezer and inspected. No fractures in the bag were detected.

The freezable/microwaveable bag was placed in a GE microwave oven (Model JE1235T001) at a cooking power 1000 watts and cooked for about 4 minutes. After being microwave cooked, the temperature measured in the food was about 95° C. to about 102° C. The bag did not melt or leak, thus demonstrating excellent heat seal strength and excellent toughness and high temperature resistance of the film composition(s) of the presently described technology.

EXAMPLE 2 (COMPARATIVE)

Commercially available microwaveable bags were received as shipped. It was found that several bags in the shipment showed visible fractures, demonstrating an inability to withstand subzero temperatures and weak strength of the film. One of the bags was analyzed to determine its construction. The analysis showed that the bag is a 3-layer laminated bag having the following structure:

| Layer Material | Layer % |
|---|---|
| PET | 23 |
| Adhesive + ink | 3 |
| Polypropylene homopolymer + TiO$_2$ | 74 |

The bag had a thickness of 3 mils.

A bag having this laminated 3-layer PET/adhesive/PP homopolymer structure was placed in the same GE microwave at the same cooking power of 1000 watts as the Example 1 bag and cooked for about 4 minutes. The microwaved bag exhibited seal failure, demonstrating poor heat seal strength and poor seal quality when exposed to microwave temperatures. In contrast, the Example 1 bag, made in accordance with the present technology, demonstrated both excellent low temperature resistance and excellent heat seal strength and toughness at microwave temperatures, making the bag suitable for microwaveable frozen food packaging as described herein.

The invention has now been described in such full, clear, concise and exact terms as to enable any person skilled in the art to which it pertains, to practice the same. It is to be understood that the foregoing describes preferred embodiments and examples of the invention and that modifications may be made therein without departing from the spirit or scope of the invention as set forth in the claims.

The invention claimed is:

1. A multilayer freezable, microwaveable film for packaging a frozen, microwaveable food product comprising:
   (a) a polyolefin film comprising:
      (i) a heat sealable layer formed from at least one polypropylene/alpha-olefin copolymer, the polypropylene/alpha-olefin copolymer having a melt flow rate of about 0.5 g/10 min. to about 45 g/10 min;
      (ii) a core layer adjacent to the heat sealable layer, the core layer being formed from a polymeric material having a melting point of at least 71° C.; and
      (iii) an outer skin layer formed from at least one polyethylene polymer resin, the at least one polyethylene polymer resin having a melt flow index of about 0.50 g/10 min. to about 20 g/10 min; and
   (b) an outer protective layer laminated to the outer skin layer, the outer protective layer being formed from a polymer material that is temperature resistant at a microwave oven temperature of about 105° C.;
      wherein the film does not fracture when exposed to a temperature of about −20° C. and does not melt or burst when exposed to a temperature of about 105° C., and wherein the film can be formed into a package for the frozen, microwaveable food product that permits the frozen food product to be heated in a microwave oven.

2. The multilayer freezable, microwaveable film of claim 1, wherein the polypropylene/alpha-olefin copolymer comprises a propylene/ethylene copolymer containing ethylene comonomer in an amount of about 1% to about 8% by weight of the copolymer.

3. The multilayer freezable, microwaveable film of claim 1, wherein the heat sealable layer comprises a blend of polypropylene/alpha-olefin copolymers.

4. The multilayer freezable, microwaveable film of claim 3, wherein the blend of polypropylene/alpha-olefin copolymers comprises a propylene/ethylene copolymer containing ethylene comonomer in an amount of about 1% to about 8% by weight.

5. The multilayer freezable, microwaveable film of claim 1, wherein the polypropylene/alpha-olefin copolymer has a melting temperature greater than 71° C.

6. The multilayer freezable, microwaveable film of claim 1, wherein the core layer comprises a homopolymer polypropylene or a high density polyethylene.

7. The multilayer freezable, microwaveable film of claim 6, wherein the homopolymer polypropylene has a melt flow rate of about 0.5 g/10 min. to about 25 g/10 min.

8. The multilayer freezable, microwaveable film of claim 1, wherein the outer skin layer is formed from a blend of at least two polyethylene resins.

9. The multilayer freezable, microwaveable film of claim 8, wherein the polyethylene resins are selected from the group consisting of linear low density polyethylene, low density polyethylene, ethylene vinyl acetate; and high density polyethylene.

10. The multilayer freezable, microwaveable film of claim 1, wherein an adhesive is used to laminate the outer protective layer to the outer skin layer.

11. The multilayer freezable, microwaveable film of claim 10, wherein the adhesive comprises a polyester-polyurethane adhesive.

12. The multilayer freezable, microwaveable film of claim 10, wherein the adhesive is selected from the group consisting of a polyester-polyurethane adhesive, a hot-melt of ethylene vinyl acetate, a hot-melt of polyamide, a hot-melt of polyester, a polyurethane adhesive, and an epoxide adhesive.

13. The multilayer freezable, microwaveable film of claim 1, wherein the polyolefin film is a coextruded blown film.

14. The multilayer freezable, microwaveable film of claim 1, wherein the polyolefin film is a coextruded cast film.

15. The multilayer freezable, microwaveable film of claim 1, wherein the polyolefin film is a laminated film.

16. A freezable, microwaveable package for packaging a frozen, microwaveable food product comprising:
   (a) a polyolefin film comprising:
      (i) a heat sealable layer formed from at least one polypropylene/alpha-olefin copolymer, the polypropylene/alpha-olefin copolymer having a melt flow rate of about 0.5 g/10 min. to about 45 g/10 min;

(ii) a core layer adjacent to the heat sealable layer, the core layer being formed from a polymeric material having a melting point of at least 71° C.; and (iii) an outer skin layer formed from at least one polyethylene polymer resin, the at least one polyethylene polymer resin having a melt flow index of about 0.50 g/10 min. to about 20 g/10 min; and (b) an outer protective layer laminated to the outer skin layer, the outer protective layer being formed from a polymer material that is temperature resistant at a microwave oven temperature of about 105° C.;

wherein the heat sealable layer is heat sealed to itself to form the package, wherein the package does not fracture when exposed to a temperature of about −20° C., and wherein the package is a pouch-shaped package that is not closely fitted about the food product and allows the frozen food product to be heated in a microwave oven without the package melting or bursting.

17. The freezable, microwaveable package of claim 16, wherein the polypropylene/alpha-olefin copolymer comprises a propylene/polyethylene copolymer containing ethylene comonomer in an amount of about 1% to about 8% by weight of the copolymer.

18. The freezable, microwaveable package of claim 16, wherein the heat sealable layer comprises a blend of polypropylene/alpha-olefin copolymers.

19. The freezable, microwaveable package of claim 16, wherein the polypropylene/alpha-olefin copolymer has a melting temperature greater than 71° C.

20. The freezable, microwaveable package of claim 16, wherein the core layer comprises a homopolymer polypropylene or a high density polyethylene.

21. The freezable, microwaveable package of claim 20, wherein the homopolymer polypropylene has a melt flow rate of about 0.5 g/10 min. to about 25 g/10 min.

22. The freezable, microwaveable package of claim 20, wherein the high density polyethylene has a melt flow rate of about 0.1 g/10 min. to about 12 g/10 min.

23. The freezable, microwaveable package of claim 16, wherein the outer skin layer is formed from a blend of at least two polyethylene resins.

24. The freezable microwaveable package of claim 16, wherein the outer, protective layer is selected from the group consisting of a polyethylene terephthalate film, a nylon film, a biaxially oriented polypropylene film; and a biaxially oriented propylene/ethylene copolymer film.

25. A frozen, microwaveable packaged food product comprising:

a frozen food;

a pouched-shaped package enclosing the frozen food product, the package comprising:

(a) a polyolefin film comprising:

(i) a heat sealable layer formed from at least one polypropylene/alpha-olefin copolymer, the polypropylene/alpha-olefin copolymer having a melt flow rate of about 0.5 g/10 min. to about 45 g/10 min;

(ii) a core layer adjacent to the heat sealable layer, the core layer being formed from a polymeric material having a melting point of at least 71° C.; and (iii) an outer skin layer formed from at least one polyethylene polymer resin, the at least one polyethylene polymer resin having a melt flow index of about 0.50 g/10 min. to about 20 g/10 min; and (b) an outer protective layer laminated to the outer skin layer, the outer protective layer being formed from a polymer material that is temperature resistant at a microwave oven temperature of about 105° C.;

wherein the package is not closely fitted about the frozen food;

wherein the package does not fracture when exposed to a temperature of about −20° C.; and wherein the package permits the frozen food to be heated directly in a microwave oven at a temperature of about 105° C. without the package melting or bursting.

* * * * *